United States Patent
Boucher et al.

(10) Patent No.: US 10,106,248 B2
(45) Date of Patent: Oct. 23, 2018

(54) APPARATUS AND METHOD FOR CONTROLLING LANDING GEAR

(71) Applicants: BOMBARDIER INC., Dorval (CA); LEARJET INC., Wichita, KS (US)

(72) Inventors: Frederic Boucher, Dorval (CA); Clovis S. Ribas, WIchita, KS (US)

(73) Assignees: BOMBARDIER INC., Dorval, Quebec (CA); LEARJET, Wichita, KS (US)

( * ) Notice: Subject to any disclaimer, the term of this patent is extended or adjusted under 35 U.S.C. 154(b) by 226 days.

(21) Appl. No.: 14/897,101

(22) PCT Filed: Jun. 12, 2014

(86) PCT No.: PCT/US2014/042080
§ 371 (c)(1),
(2) Date: Dec. 9, 2015

(87) PCT Pub. No.: WO2014/201225
PCT Pub. Date: Dec. 18, 2014

(65) Prior Publication Data
US 2016/0129996 A1    May 12, 2016

Related U.S. Application Data

(60) Provisional application No. 61/835,275, filed on Jun. 14, 2013.

(51) Int. Cl.
*B64C 25/22* (2006.01)
*B64C 25/26* (2006.01)

(52) U.S. Cl.
CPC .............. *B64C 25/22* (2013.01); *B64C 25/26* (2013.01)

(58) Field of Classification Search
CPC ................................ B64C 25/22; B64C 25/26
See application file for complete search history.

(56) References Cited

U.S. PATENT DOCUMENTS

| 6,792,844 B1 | 9/2004 | Gedge et al. |
| 8,109,465 B1 | 2/2012 | Heer |

(Continued)

FOREIGN PATENT DOCUMENTS

| CN | 102452479 A | 5/2012 |
| GB | 757705 | 9/1956 |

OTHER PUBLICATIONS

International Preliminary Report on Patentability dated Dec. 23, 2015, for International Patent Application No. PCT/US2014/042080.

(Continued)

*Primary Examiner* — Brian M O'Hara
(74) *Attorney, Agent, or Firm* — Karceski IP Law, PLLC

(57) ABSTRACT

A landing gear system includes landing gear, an uplock that is releasably engageable with the landing gear, an uplock hydraulic actuator operably connected to the uplock, a landing gear hydraulic actuator operatively connected to the landing gear, and a controller operatively connected to the uplock hydraulic actuator and the landing gear hydraulic actuator. In response to receipt of a command to deploy the landing gear, the controller actuates the uplock hydraulic actuator and the landing gear hydraulic actuator to the UP condition and then actuates the uplock hydraulic actuator and the landing gear actuator to the DOWN condition. An alternative embodiment incorporates a piloted check valve upstream of the landing gear hydraulic actuator. The piloted check valve delays operation of the landing gear hydraulic actuator until release of the landing gear by the uplock.

20 Claims, 14 Drawing Sheets

(56) References Cited

U.S. PATENT DOCUMENTS

| | | |
|---|---|---|
| 8,418,958 B2 | 4/2013 | Evans |
| 8,770,514 B2 * | 7/2014 | Brighton ................. B64C 25/20 244/102 A |
| 2011/0024557 A1 | 2/2011 | Brighton et al. |
| 2012/0097792 A1 | 4/2012 | Ernis et al. |

OTHER PUBLICATIONS

International Search Repot and Written Opinion dated Sep. 26, 2014, for International Patent Application No. PCT/US2014/042080.
Chinese Office Action dated Aug. 12, 2016, for Chinese Patent Application No. 201480033851.4.
European Office Action dated Feb. 20, 2017, for European Patent Application No. 14737110.8.
Chinese Office Action dated Mar. 23, 2017, for Chinese Patent Application No. 201480033851.4.
European Office Action dated Jul. 5, 2018, for European Patent Application No. 14737110.8.

\* cited by examiner

APPARATUS AND METHOD FOR CONTROLLING LANDING GEAR

CROSS-REFERENCE TO RELATED APPLICATION(S)

This is a National Stage Entry into the United States Patent and Trademark Office from International PCT Patent Application No. PCT/US2014/042080, having an international filing date of Jun. 12, 2014, which relies for priority on U.S. Provisional Patent Application Ser. No. 61/835,275, filed Jun. 14, 2013, both of which are hereby incorporated by reference in their entireties.

FIELD OF THE INVENTION

The present invention concerns a construction for an apparatus for controlling the operation of the landing gear on an aircraft. In particular, the present invention encompasses an apparatus and a method for controlling the operation of the landing gear to reduce a force conflict associated with the operation thereof. More specifically, the present invention encompasses an apparatus and method of operation of a hydraulic system in an aircraft whereby hydraulic force conflict(s) are reduced or avoided between the hydraulic actuator associated with the landing gear and the hydraulic actuator associated with the landing gear uplock device.

DESCRIPTION OF THE RELATED ART

As should be apparent to those skilled in the art, modern aircraft include a hydraulic system for operation of many of the components thereon.

One of the many systems that utilize hydraulic power for operation is the landing gear system. On aircraft so equipped, hydraulic pressure causes the landing gear both to deploy and to retract.

In addition, modern aircraft include a locking mechanism, also referred to as an "uplock," that engages the landing gear when the landing gear is in a retracted condition. The uplock holds the landing gear in the retracted position until the aircraft is preparing for landing. When the uplock is engaged, the hydraulic actuators associated with the retraction and deployment of the landing gear may be powered down (or depressurized), as it is not necessary to maintain pressure in the hydraulic system for the landing gear during flight. The uplock carries the weight of the landing gear while the aircraft is in flight.

When the aircraft is preparing for landing, the hydraulic system associated with the landing gear system is powered up and the hydraulic fluid is pressurized. So that the landing gear may be deployed, the hydraulic pressure acts in two primary ways that are relevant to the present invention. First, the hydraulic system pressurizes the actuator(s) associated with the landing gear, forcing the landing gear to deploy from a stowed position. Second, the hydraulic system pressurizes the uplock mechanism so that the uplock releases the landing gear for deployment.

It has been known that the simultaneous application of pressure to the landing gear actuator and the uplock actuator create what is referred to herein as a "force fight" between the landing gear actuator and the uplock. Specifically, the simultaneous operation of the uplock actuator and the landing gear actuator result in the application of a downward force on the uplock device during the time that the uplock device is releasing the landing gear. This increases the force on the uplock device creating the "force fight." The uplock device not only is required to bear the weight of the landing gear, but it is also required, for a brief period of time, to bear the force of the landing gear actuator as that force is applied to the landing gear.

When the uplock device finally releases the landing gear, the combined weight of the landing gear and the force applied by the landing gear actuator causes a momentary jolt of forces on the landing gear that results in what has been termed as a "loud thump." This loud thump, while not detrimental to the operation of the landing gear system, may be disconcerting to passengers.

Numerous systems involving landing gear deployment are known in the prior art. Examples include, but are not limited to U.S. Pat. Nos. 8,418,958, 8,109,465, and 6,792,844. However, these prior art systems fail to adequately address deficiencies relating to the force fight as described above.

It is in the context of this confluence of factors that the present invention was developed.

SUMMARY OF THE INVENTION

The present invention addresses, at least in part, one or more of the deficiencies noted with respect to the prior art.

In one aspect, the present invention provides a landing gear system that includes landing gear, an uplock that is releasably engageable with the landing gear, and an uplock hydraulic actuator operably connected to the uplock. The uplock actuator causes the uplock to transition between an UP condition where the uplock engages the landing gear and a DOWN condition where the uplock disengages from the landing gear. The landing gear system further includes a landing gear hydraulic actuator operably connected to the landing gear. The landing gear hydraulic actuator causes the landing gear to transition between an UP condition where the landing gear is stowed and a DOWN condition where the landing gear is deployed. A controller is operatively connected to the uplock hydraulic actuator and the landing gear hydraulic actuator. In response to receipt of a command to deploy the landing gear, the controller actuates the uplock hydraulic actuator and the landing gear hydraulic actuator to the UP condition and then actuates the uplock hydraulic actuator and the landing gear actuator to the DOWN condition.

In one contemplated embodiment, the landing gear system also includes hydraulic piping connecting the uplock hydraulic actuator and the landing gear hydraulic actuator to one another. In this embodiment, a selector valve may be disposed in the hydraulic piping. The selector valve may provide selective pressurization of the hydraulic piping.

It is contemplated that the hydraulic piping connected to the landing gear hydraulic actuator may be larger than the hydraulic piping connected to the uplock hydraulic actuator.

In another embodiment, the uplock may support a weight W of the landing gear when the landing gear is in a stowed position, such that when the controller actuates the landing gear hydraulic actuator to the UP condition, the weight W supported by the uplock is reduced.

Further, the present invention provides a landing gear system where, when the controller actuates the landing gear hydraulic actuator to the UP condition, the weight W supported by the uplock is removed.

It is contemplated that the landing gear system may encompass one of a right side landing gear, a left side landing gear, and a nose landing gear.

The present invention also provides a method of operating a landing gear system including landing gear, an uplock, wherein the uplock is releasably engageable with the landing gear, an uplock hydraulic actuator operably connected to the uplock, wherein the uplock actuator causes the uplock to transition between an UP condition where the uplock engages the landing gear and a DOWN condition where the uplock disengages from the landing gear, a landing gear hydraulic actuator operably connected to the landing gear, wherein the landing gear hydraulic actuator causes the landing gear to transition between an UP condition where the landing gear is stowed and a DOWN condition where the landing gear is deployed, and a controller operatively connected to the uplock hydraulic actuator and the landing gear hydraulic actuator. The method is contemplated that include receiving a landing gear deployment signal by the controller, in response to receipt of the landing gear deployment signal by the controller, actuating the uplock hydraulic actuator and the landing gear hydraulic actuator to the UP condition, and subsequently actuating the uplock hydraulic actuator and the landing gear actuator to the DOWN condition.

Where the landing gear system also includes hydraulic piping connecting the uplock hydraulic actuator and the landing gear hydraulic actuator to one another and a selector valve disposed in the hydraulic piping adapted to provide selective pressurization of the hydraulic piping, the method also may include pressurizing the hydraulic piping by the selector valve in response to receipt by the controller of the landing gear deployment signal before actuating the uplock hydraulic actuator and the landing gear hydraulic actuator.

In another contemplated embodiment, the present invention encompasses a landing gear system with landing gear, an uplock that is releasably engageable with the landing gear, and an uplock hydraulic actuator operably connected to the uplock. The uplock actuator causes the uplock to transition between an UP condition where the uplock engages the landing gear and a DOWN condition where the uplock disengages from the landing gear. A landing gear hydraulic actuator is operably connected to the landing gear. The landing gear hydraulic actuator causes the landing gear to transition between an UP condition where the landing gear is stowed and a DOWN condition where the landing gear is deployed. A controller is operatively connected to the uplock hydraulic actuator and the landing gear hydraulic actuator. In response to receipt of a command to deploy the landing gear, the controller actuates the landing gear hydraulic actuator to the UP condition and then actuates the uplock hydraulic actuator and the landing gear actuator to the DOWN condition.

In this embodiment, it is also contemplated that the system may include hydraulic piping connecting the uplock hydraulic actuator and the landing gear hydraulic actuator to one another. If so, a selector valve may be disposed in the hydraulic piping, adapted to provide selective pressurization of the hydraulic piping.

A further aspect of the present invention provides a method of operating a landing gear system including landing gear, an uplock, wherein the uplock is releasably engageable with the landing gear, an uplock hydraulic actuator operably connected to the uplock, wherein the uplock actuator causes the uplock to transition between an UP condition where the uplock engages the landing gear and a DOWN condition where the uplock disengages from the landing gear, a landing gear hydraulic actuator connected to the landing gear, wherein the landing gear hydraulic actuator causes the landing gear to transition between an UP condition where the landing gear is stowed and a DOWN condition where the landing gear is deployed, and a controller operatively connected to the uplock hydraulic actuator and the landing gear hydraulic actuator. The method includes receiving a landing gear deployment signal by the controller, in response to receipt of the landing gear deployment signal by the controller, actuating the landing gear hydraulic actuator to the UP condition, and actuating the uplock hydraulic actuator and the landing gear actuator to the DOWN condition.

With respect to this method, the present invention contemplates the inclusion of hydraulic piping connecting the uplock hydraulic actuator and the landing gear hydraulic actuator to one another and a selector valve disposed in the hydraulic piping, adapted to provide selective pressurization of the hydraulic piping. If so, the method also may entail pressurizing the hydraulic piping by the selector valve in response to receipt by the controller of the landing gear deployment signal before actuating the uplock hydraulic actuator and the landing gear hydraulic actuator.

The present invention also is considered to encompass a landing gear system that includes landing gear, an uplock that is releasably engageable with the landing gear, and an uplock hydraulic actuator operably connected to the uplock. The uplock actuator causes the uplock to transition between an UP condition where the uplock engages the landing gear and a DOWN condition where the uplock disengages from the landing gear. The system also includes a landing gear hydraulic actuator connected to the landing gear. The landing gear hydraulic actuator causes the landing gear to transition between an UP condition where the landing gear is stowed and a DOWN condition where the landing gear is deployed. The system further includes a piloted check valve that is operatively connected at least to the landing gear hydraulic actuator. A controller is operatively connected to the uplock hydraulic actuator, the landing gear hydraulic actuator, and the piloted check valve. In response to receipt of a command to deploy the landing gear, the controller causes the landing gear to be held in the UP condition via the piloted check valve and actuates the uplock hydraulic actuator to the DOWN condition, resulting in a delayed release of the piloted check valve, thereby permitting the landing gear hydraulic actuator to actuate to the DOWN condition.

In this embodiment, it is contemplated that the method includes actuating the landing gear hydraulic actuator to the UP condition before holding the landing gear in the UP condition via the piloted check valve.

In an additional aspect of the present invention, it is contemplated that the landing gear system includes hydraulic piping connecting the uplock hydraulic actuator and the landing gear hydraulic actuator to one another. If so, a selector valve may be disposed in the hydraulic piping, adapted to provide selective pressurization of the hydraulic piping.

According to another contemplated embodiment of the present invention, a method of operating a landing gear system that includes landing gear, an uplock, wherein the uplock is releasably engageable with the landing gear, an uplock hydraulic actuator operably connected to the uplock, wherein the uplock actuator causes the uplock to transition between an UP condition where the uplock engages the landing gear and a DOWN condition where the uplock disengages from the landing gear, a landing gear hydraulic actuator connected to the landing gear, wherein the landing gear hydraulic actuator causes the landing gear to transition between an UP condition where the landing gear is stowed and a DOWN condition where the landing gear is deployed, a piloted check valve operatively connected at least to the landing gear hydraulic actuator, and a controller operatively connected to the uplock hydraulic actuator, the landing gear hydraulic actuator, and the piloted check valve. The method includes receiving a landing gear deployment signal by the controller, in response to receipt of the landing gear deployment signal by the controller, holding the landing gear hydraulic actuator in the UP condition via the piloted check valve, actuating the uplock hydraulic actuator to the DOWN condition, and releasing the piloted check valve, thereby permitting the landing gear hydraulic actuator to actuate to the DOWN condition.

The method also may include, in response to receipt of the landing gear deployment signal by the controller, actuating the uplock hydraulic actuator and the landing gear hydraulic actuator to the UP condition.

Further, where the landing gear system further includes hydraulic piping connecting the uplock hydraulic actuator, the piloted check valve, and the landing gear hydraulic actuator to one another and a selector valve disposed in the hydraulic piping, adapted to provide selective pressurization of the hydraulic piping, the method also may include pressurizing the hydraulic piping by the selector valve in response to receipt by the controller of the landing gear deployment signal before actuating the uplock hydraulic actuator, the piloted check valve, and the landing gear hydraulic actuator.

A further aspect of the present invention contemplates a landing gear system with landing gear having a weight W and an uplock. The uplock is releasably engageable with the landing gear. The uplock supports at least a portion of the weight W of the landing gear when the landing gear is in a stowed position. The system also includes an uplock hydraulic actuator operably connected to the uplock. The uplock actuator causes the uplock to transition between an engaged condition and a disengaged condition, wherein in the disengaged condition the uplock disengages from the landing gear. The system also may include a landing gear hydraulic actuator connected to the landing gear. The landing gear hydraulic actuator causes the landing gear to transition between a stowed condition and a deployed condition. A controller may be operatively connected to the uplock hydraulic actuator and the landing gear hydraulic actuator. In response to receipt of a command to deploy the landing gear, the controller causes actuation of the landing gear hydraulic actuator for causing the landing gear to move into a position that reduces the weight W applied to the uplock, and then subsequently causes actuation of the uplock hydraulic actuator into the disengaged position and actuation of the landing gear hydraulic actuator into the deployed condition.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF
EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the context of the construction of a jet aircraft where one or more jet engines (also referred to as turbine engines or turbofan engines) are affixed (or attached) to the fuselage or the wings of the aircraft. While the invention is discussed in this context, the present invention is not intended to be limited solely to the construction of aircraft with jet engines. It is contemplated that the present invention may be employed in connection with other type of aircraft, as should be apparent to those skilled in the art.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or bow end) of the aircraft. The term "rear" (or its equivalent) refers to the aft end (back end or stern) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft. The term "lateral" refers to the lateral direction of the aircraft that extends from the right side to the left side of the aircraft (i.e., as defined by the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground.

Figure 1:
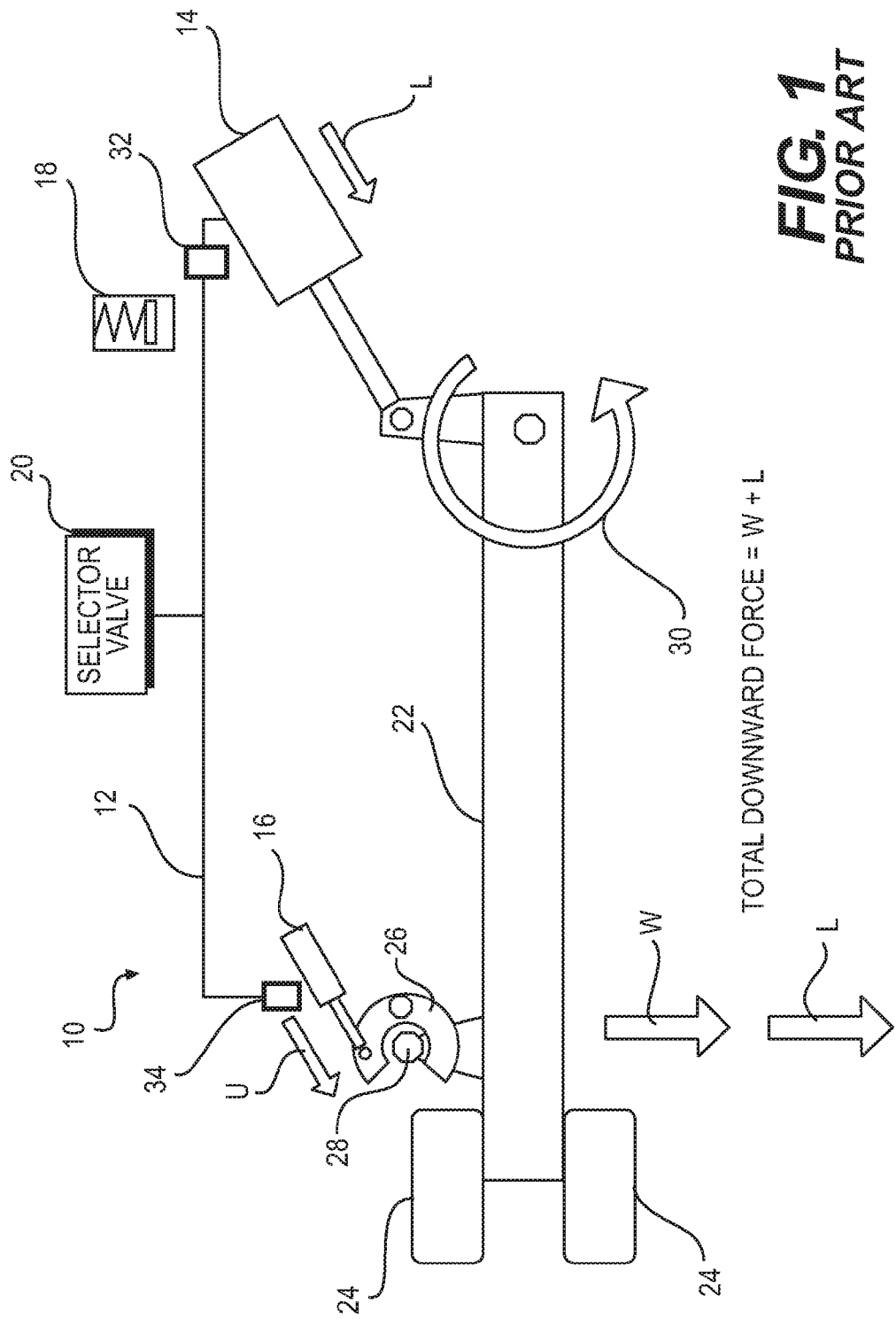
FIG. 1 is a graphical representation of the mechanical system associated with the landing gear of an aircraft, including the uplock mechanism, the graphical representation being useful in describing the force fight that occurs when the landing gear is deployed from the stowed condition.

FIG. 1 is graphical representation of a conventional hydraulic system 10 for the landing gear and uplock on an aircraft. The conventional system includes hydraulic piping 12 that is connected to a landing gear actuator 14 and an uplock actuator 16. A pressurization cylinder 18 provides pressure to the hydraulic piping 12 at a suitable pressure for the conventional hydraulic system 10. A selector valve 20 also is provided in the hydraulic piping. The selector valve 20 opens to provide hydraulic pressure to the system 10 when the system 10 is needed for operation. For example, the selector valve 20 will open to provide hydraulic pressure during taxi, take-off, and landing ("TTL"), which are the times when the landing gear 22 is deployed, among others.

As shown in FIG. 1, the landing gear 22 is in the stowed condition. The landing gear 22 includes two tires 24. Of course, the landing gear 22 may have a larger or smaller number of tires without departing from the scope of the present invention. The uplock 26, which is attached to the aircraft, engages a pin 28 attached to the landing gear 22. As should be apparent, when the system 10 is in operation, the landing gear 22 rotates, in the direction of the arrow 30, to transition from the stowed condition to the deployed condition.

When the system 10 is in operation, the selector valve 20 opens to pressurize the hydraulic piping 12. When a command is given for the landing gear 22 to be deployed, servo valves 32, 34 associated with the actuators 14, 16, cause fluid to fill the actuators 14, 16 so that the actuators 14, 16 cause the landing gear 22 to deploy. It is noted that the servo valves 32, 34 determine if the actuators 14, 16 move in the UP direction or the DOWN direction. In other words, the servo valves 32, 34 are employed to determine the direction of operation of the associated actuators 14, 16.

It is noted that the servo valves 32, 34 are not required to practice the present invention. In the absence of servo valves 32, 34, the selector valve 20 may be actuated to pressurize the hydraulic piping so that the actuators 14, 16 move together in the UP or DOWN directions. In this embodiment, where the selector valve 20 provides directionality of the pressurization of the hydraulic piping UP or DOWN, the actuators 14, 16 respond similarly to one another. In other words, where the selector valve 20 pressurizes the hydraulic piping in the UP direction, both actuators will actuate in the UP direction. When the selector valve 20 pressurizes the hydraulic piping in the DOWN direction, both actuators 14, 16 will actuate in the DOWN direction.

For purposes of the present discussion, when the landing gear hydraulic actuator 14 moves the landing gear 22 to the stowed condition, this is referred to as an UP condition for the landing gear hydraulic actuator 14. When the landing gear hydraulic actuator 14 applies force to move the landing gear 22 to the deployed state, this is referred to as a DOWN operation or condition of the landing gear hydraulic actuator 14.

Also for purposes of the present discussion, when the uplock actuator 16 rotates to capture the pin 28 and stow the landing gear 22, this operation is referred to an UP operation or UP condition. When the uplock actuator 16 rotates to release the pin 28 and, therefore, the landing gear 22, this is referred to as a DOWN operation or condition.

In the case where the landing gear is deployed, the actuator 14 applies a downward pressure on the landing gear 22, forcing the landing gear 22 to rotate in the direction of the arrow 30. The force applied by the actuator 14 is designated as "L" in FIG. 1. At the same time, the actuator 16 applies a force U on the uplock 26 to cause the uplock to release the pin 28 on the landing gear. As a result of the application of the force L by the landing gear actuator 14 and the weight W of the landing gear itself, the total downward force on the landing gear 22 is W+L. As made apparent from FIG. 1, in the conventional system 10, the total downward force (W+L) is experienced by the uplock 26 until the uplock 26 rotates a sufficient degree to release the pin 28.

The application of the weight W and the landing gear load L simultaneously on the uplock 26 is referred to as the "force fight" associated with the operation of the system 10. When the pin 28 is finally released from the uplock 26, the total downward force (W+L) generates a sound, often referred to as a loud "thump." While the force fight is not detrimental to the system 10, the loud "thump" may be distracting to passengers. At least for this reason, therefore, there has developed a desire to reduce the force fight.

Figure 2:
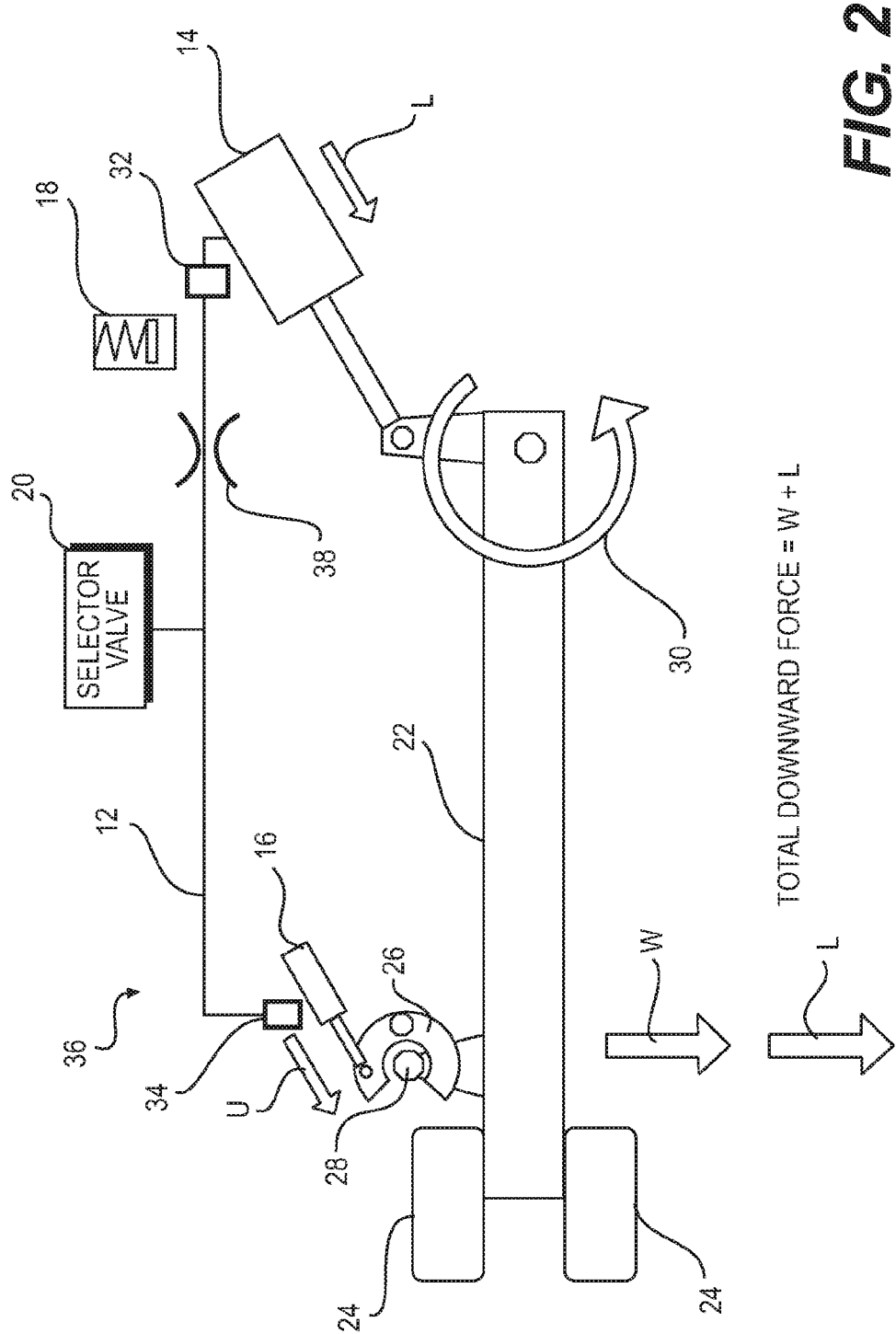
FIG. 2 is a graphical representation of one solution described in the prior art for resolving the issues associated with the force fight between the uplock mechanism and the landing gear on an aircraft.

FIG. 2 illustrates one resolution contemplated to address the force fight. In this first solution, a system 36 is illustrated that includes a restrictor 38. As should be apparent to those skilled in the art, the size of the hydraulic line to the uplock actuator 16 is smaller than the size of the hydraulic line to the landing gear actuator 14. While this naturally results in a difference in the operation of the two actuators 14, 16, this difference may be exaggerated by the addition of a restrictor 38. The restrictor 38 slows the flow of hydraulic fluid to the landing gear actuator 14 by a fractional amount of time. The slower flow causes the landing gear actuator 14 to actuate at a point in time slightly delayed from the system 10 illustrated in FIG. 1. As a result, the force L applied by the landing gear actuator 14 is slightly less than that applied in the system 10.

With respect to this first solution, it has been proposed to add a canister to the hydraulic piping 12 in the location of the restrictor 38. The canister is understood to receive some of the flow of hydraulic fluid, thereby also delaying the operation of the landing gear actuator 14.

Figure 3:
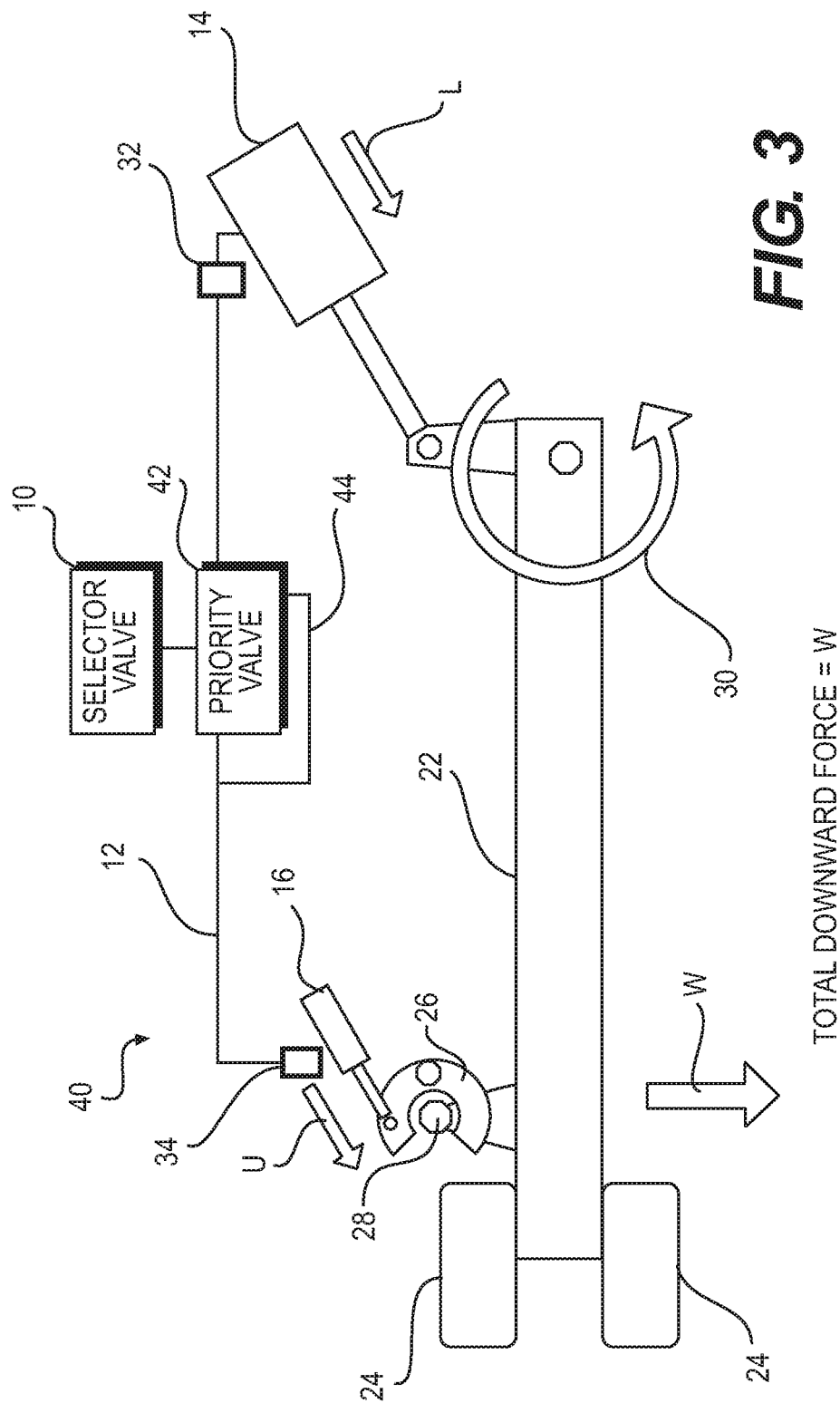
FIG. 3 is a graphical representation of another solution described in the prior art for resolving the issues associated with the force fight between the uplock mechanism and the landing gear on an aircraft.

FIG. 3 is a graphical illustration of a second solution to the force fight. In this second solution, the system 40 includes a priority valve 42 and priority piping 44. In the system 40, the priority valve 42 prioritizes the application of hydraulic forces. Specifically, the priority valve 42 first allows the uplock actuator 16 to actuate, thereby releasing the landing gear 22 before the landing gear actuator 14 is permitted to actuate. In this embodiment, the force L applied by the landing gear actuator 14 is delayed so that the only force acting on the uplock 26 at the time that the uplock 26 releases the landing gear 22 is the weight W of the landing gear 22.

Figure 4:
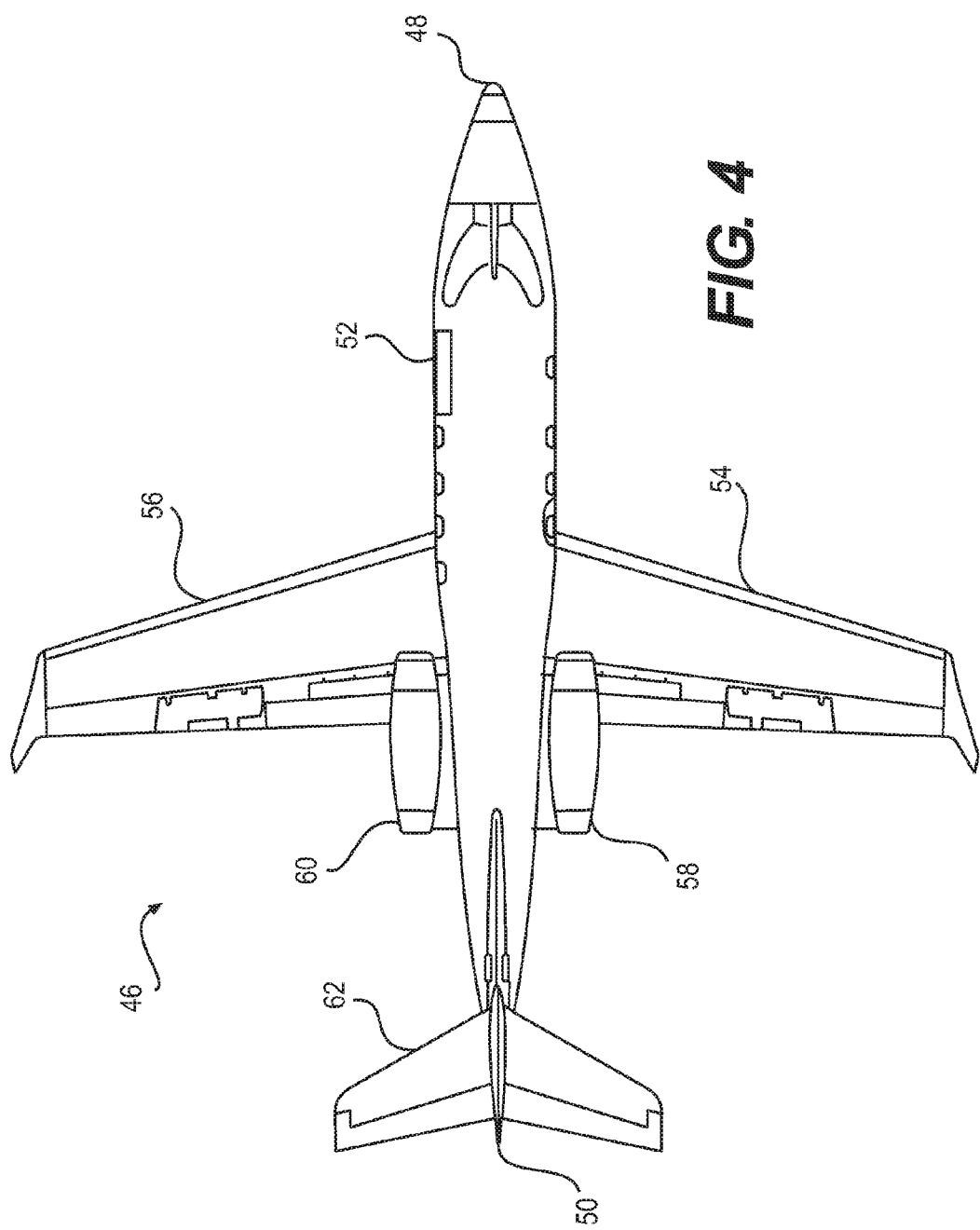
FIG. 4 is a graphical, top view of one aircraft on which one embodiment of the apparatus and method of the present invention may be employed.

FIG. 4 is a top view of one non-limiting aircraft 46 to which the apparatus and method of the present invention may be applied. In the embodiment shown, aircraft 46 is a small jet, of the type typically owned and operated privately, either by individuals or corporations. However, the aircraft 46 could also be a commercial aircraft operated by an airline company.

The aircraft 46 includes a front end 48 and a rear end 50. The fuselage 52 includes a right wing 54 and a left wing 56. Right and left engines 58, 60 are attached to the fuselage 52, behind the wings 54, 56. A tail section 62 (or empennage) is attached at the rear end 50 of the aircraft 46. As should be apparent to those skilled in the art, since aircraft 46 are relatively modest in size in comparison to larger aircraft, the weight W of the landing gear 22 is similarly modest.

Figure 5:
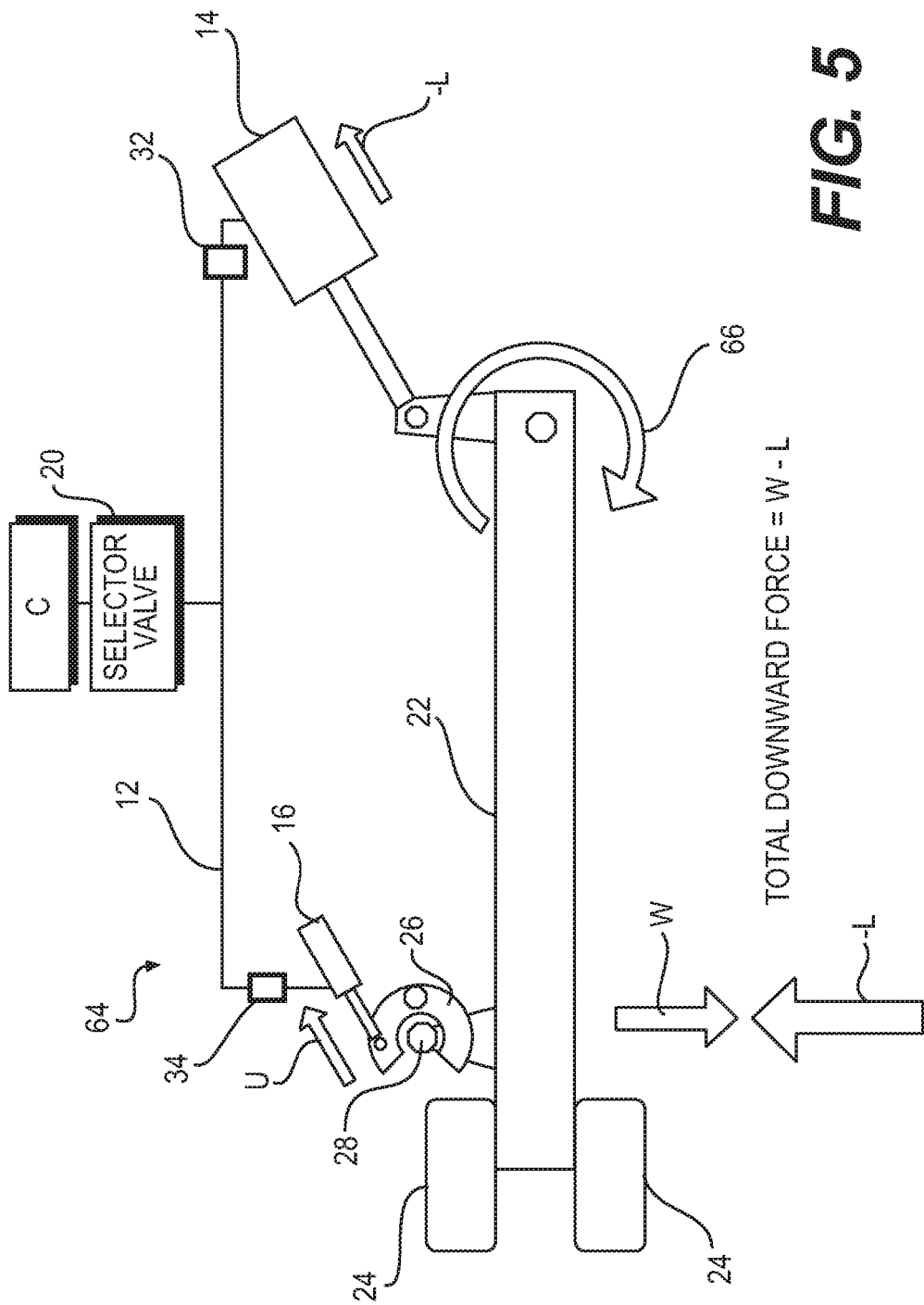
FIG. 5 is a graphical representation of a first embodiment of an apparatus according to the present invention.

Given the relatively modest weight W of the landing gear 22, one embodiment of the present invention comprises the landing gear hydraulic system 64 as illustrated in FIG. 5.

In the system 64, when the landing gear 22 is to be lowered from the stowed condition to the deployed condition, the landing gear actuator 14 is first commanded to raise the landing gear 22 UP. The uplock actuator 16 is similarly commanded to stroke upwardly. As a result of the upward stroke of the landing gear actuator 14, the landing gear 22 rotates in the direction of the arrow 66. The upward action of the landing gear actuator 14 is contemplated to exert a force −L that may be greater than the weight W of the landing gear 22. As a result, it is contemplated that the total downward force of the landing gear will be W−L. When L>W, it is contemplated that the total force will be upward, against the direction of gravity (or a negative value).

Immediately following the upward motion of the actuators 14, 16, the system 64 will reverse the direction of the actuators 14, 16. Since the weight W of landing gear is momentarily reduced or removed from the uplock 26 in this arrangement, after application of the upward force −L, when the force is reversed, the uplock 26 may be released without any force (W or L) thereon. As a result, there is no loud thump, as discussed in detail above.

With continued reference to FIG. 5, it is noted that the system 64 includes a controller C. The controller C is shown as being connected to the selector valve 20. While this connection is illustrated, it is noted that the controller C may be operatively connected to any other components of the system 64 without departing from the scope of the present invention.

The controller C is contemplated to be a device that provides a signal to deploy or stow the landing gear 22. A control signal may be issued by a member of the flight crew, for example, to the controller C. The controller C may be part of or associated with one or more computer systems on board the aircraft, including, but not limited to, the flight management system ("FMS"). The controller C may be configured as a computing unit that includes a processing unit and a memory connected by a communication bus. The memory includes data and program instructions, such that the processing unit can process the data and the program instructions in order to implement the functionality of the controller described herein. The computing unit may also comprise a number of interfaces for receiving or sending data elements to external devices. For example, the controller C may include an interface for receiving a landing gear deployment signal and an interface for issuing a command signal to the selector valve 20 for causing the pressurization of the hydraulic piping.

Figure 6:
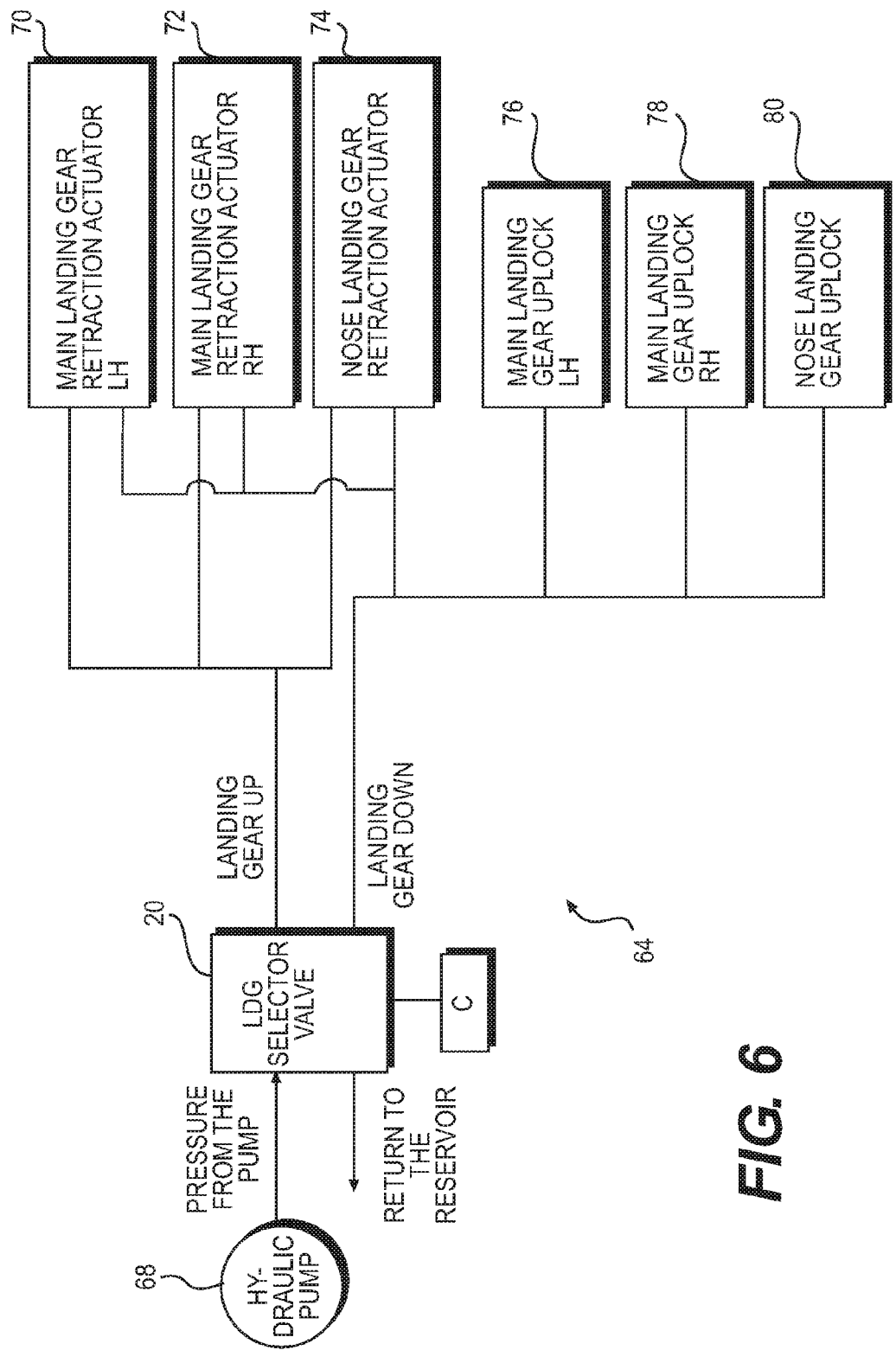
FIG. 6 is a diagrammatic representation of the apparatus illustrated in FIG. 5.

FIG. 6 is a diagrammatic representation of the system 64 illustrated in FIG. 5. In this view, the hydraulic pump 68 is shown. In addition, the landing gear elements are separated into three parts, as would be found on the aircraft 46. Specifically, the system 64 includes a left hand landing gear actuator 70, a right hand landing gear actuator 72, and a nose landing gear actuator 74. In addition, the system includes a left hand uplock actuator 76, a right hand uplock actuator 78, and a nose uplock actuator 80. Each of the actuators are contemplated to operate in the manner discussed above.

Figure 7:
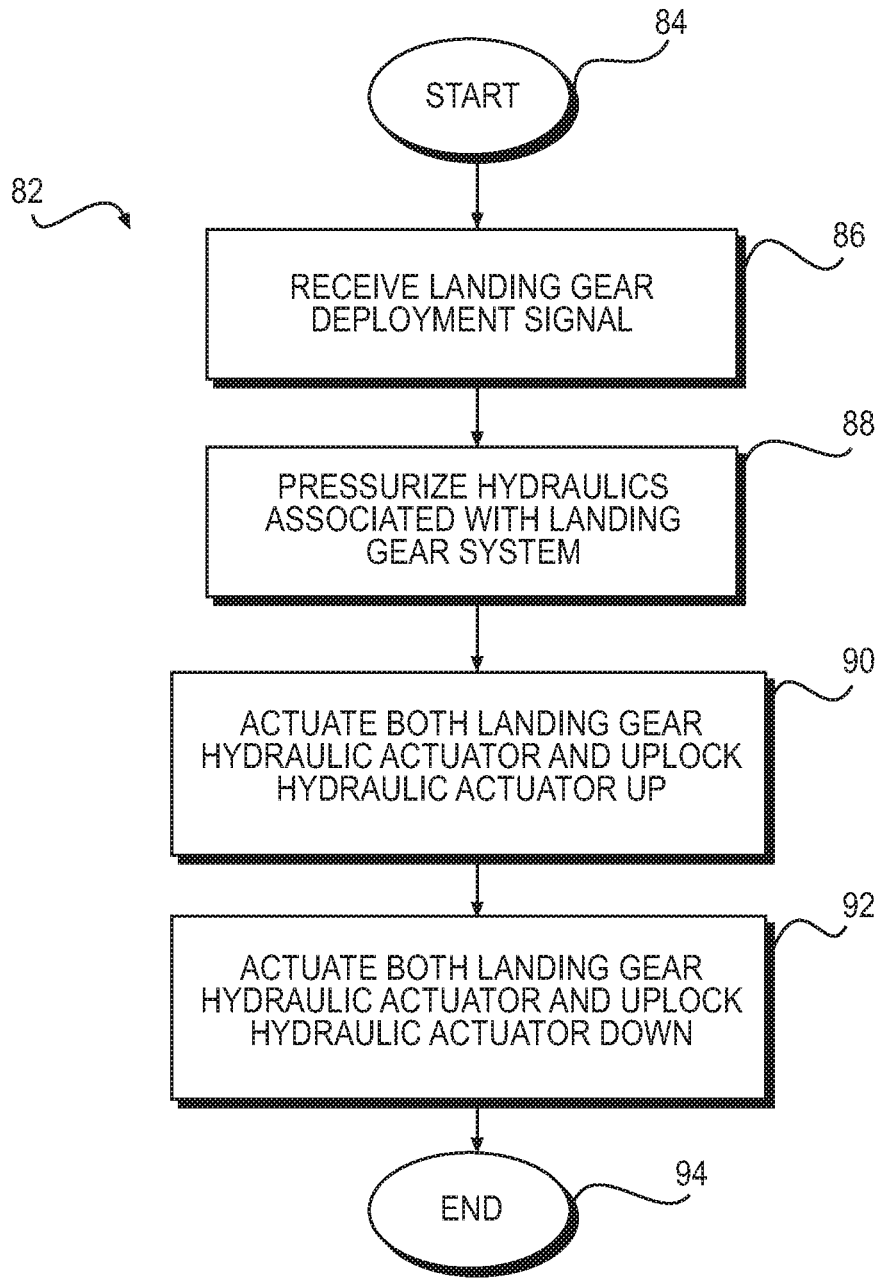
FIG. 7 is a flow chart illustrating a first method operable on the apparatus illustrated in FIG. 5.

FIG. 7 is a flow diagram that illustrates a method 82 of operation of the system 64 illustrated in FIGS. 5 and 6.

The method 82 starts at 84. The method 82 proceeds to step 86, where the system 64, at the controller C, receives a landing gear deployment signal. The landing gear deployment signal may be issued from the flight crew, typically by the pilot or co-pilot. Or alternatively, the landing gear deployment signal may be issued from a control unit that generates the deployment signal on a basis of one or more sensor readings, such as a reading of altitude, for example. Upon receipt of the landing gear deployment signal at step 86, the method 82 proceeds to step 88 where the hydraulics associated with the landing gear hydraulic system 64 are pressurized. As noted above, this is accomplished by the selector valve 20. It is noted, however, that the selector valve 20 need not be the only component that assists with the performance of this step 88.

After the hydraulic system 64 is pressurized, the method 82 proceeds to step 90, where both the landing gear hydraulic actuator 14 and the uplock hydraulic actuator 16 are directed into the UP position, at least for a brief moment in time. As discussed in connection with FIG. 5, the UP command provided to the landing gear hydraulic actuator 14 is contemplated to provide a force that reduces, at least in part, the weight W of the landing gear 22 applied to the uplock 26. In accordance with a non-limiting example, the hydraulic actuator 14 provides a force of −L that exceeds the weight W of the landing gear 22, thereby removing all weight from the uplock 26.

The method 82 then proceeds to step 92, where both the landing gear hydraulic actuator 14 and the uplock hydraulic actuator 16 are given DOWN commands and actuate accordingly. As noted above, the uplock hydraulic actuator 16 is smaller than the landing gear hydraulic actuator 14. As a result, the uplock hydraulic actuator 16 responds more rapidly to the DOWN command than the landing gear hydraulic actuator 14. Accordingly, the uplock hydraulic actuator 16 is able to move the uplock 26 into a disengaged position before the landing gear hydraulic actuator 14 causes a downward force to be applied by the pin 28 into engagement with the uplock 26. Since the uplock 26 is able to be moved out of the path of the pin 28 before the pin 28 impacts with the uplock 26, the landing gear 22 moves without obstruction and, therefore, free from at least some force fight or a loud thump discussed above.

The method 82 ends at 94.

Figure 8:
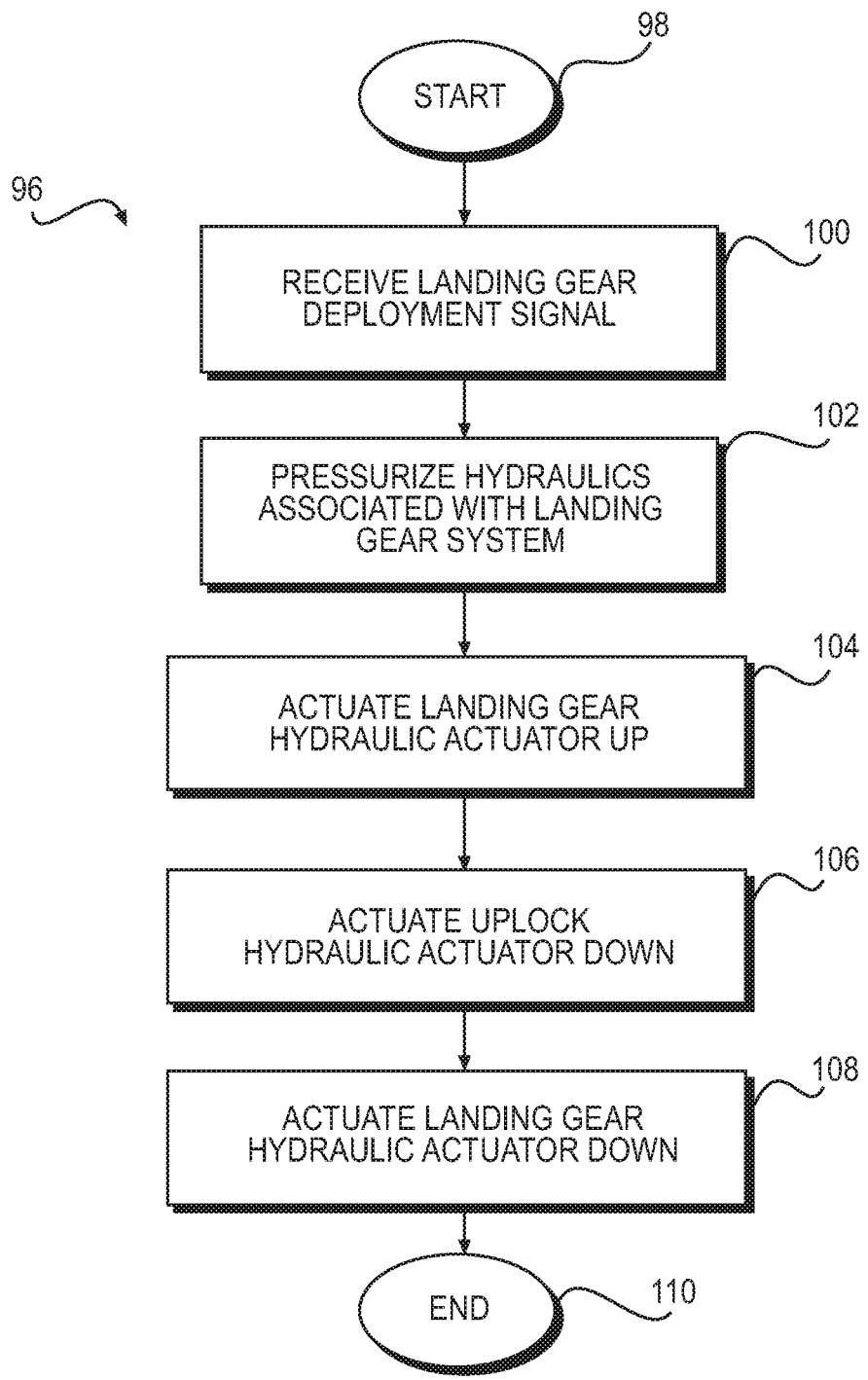
FIG. 8 is a flow chart illustrating a second method operable on the apparatus illustrated in FIG. 5.

FIG. 8 is a flow diagram that illustrates a second method 96 of operation of the system 64 illustrated in FIGS. 5 and 6, in which the landing gear hydraulic actuator 14 is provided with an UP command independently of the uplock hydraulic actuator.

This second method 96 starts at 98.

At step 100, the hydraulic system 64 receives a landing gear deployment signal at the controller C.

At step 102, the hydraulics associated with the system 64 are pressurized. As noted above, the selector valve 20 is contemplated to accomplish this function. As noted, the selector valve 20 may operate independently or together with other components to pressurize the hydraulic system 64.

At step 104, the landing gear hydraulic actuator 14 is commanded into the UP mode of operation. As with the method 82, performance of this step 104 lifts the weight W of the landing gear 22 from the uplock 26. As before, it is contemplated that the operation of the landing gear hydraulic actuator 14 will apply a load −L onto the landing gear 22. Thereby reducing the load on the uplock 26. In a non-limiting embodiment, L>W, such that the landing gear 22 is contemplated to move upwardly within the uplock 26.

The method 96 then proceeds to step 106 where the uplock hydraulic actuator 16 is commanded DOWN, thereby releasing the pin 28 on the landing gear 22. Since the landing gear 22 has been raised by the landing gear hydraulic actuator UP command, there is reduced weight W on the uplock at this step 106. Accordingly, there is reduced force fight or loud thump.

The method 96 ends at step 110.

Figure 9:
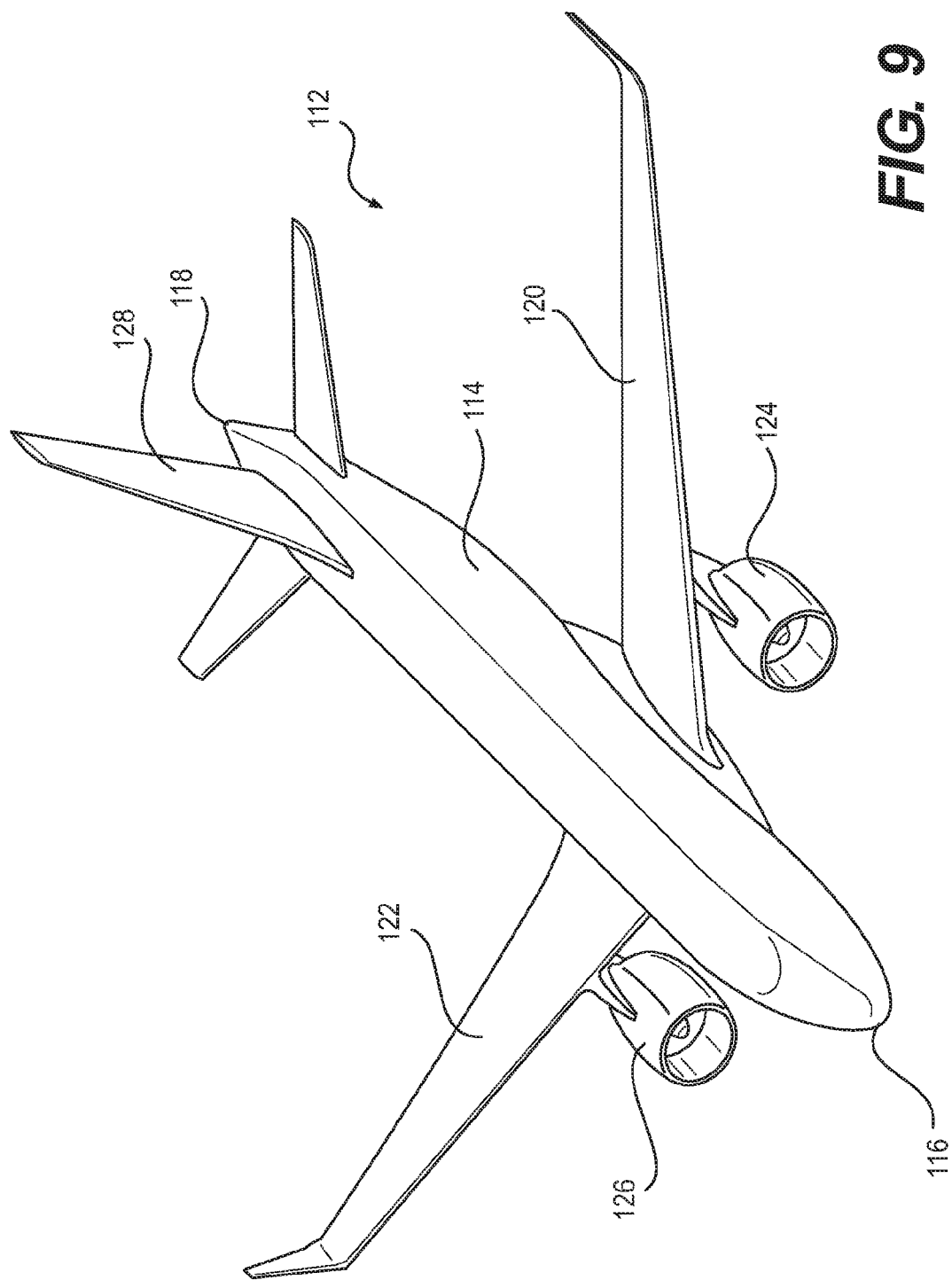
FIG. 9 is a perspective illustration of a second aircraft on which one embodiment of the apparatus and method of the present invention may be employed.

FIG. 9 illustrates a different type of jet aircraft 112. This aircraft 112 is larger than the aircraft 46 illustrated in FIG. 4. Specifically, this aircraft 112 is contemplated to be of a size suitable for commercial service. However, it is to be understood that it also may be used for private purposes, either by individuals or corporations The aircraft 112 has a fuselage 114 with a front end 116 and a rear end 118. Two wings 120, 122 extend laterally from the fuselage 114. Engines 124, 126 are mounted on the wings 120. A tail section 128 is mounted to the rear end 118 of the fuselage 114.

The system 64 and methods 82, 96 that are discussed above for the aircraft 46 are contemplated to be applicable to the aircraft 112 that is illustrated in FIG. 9.

In addition, other apparatuses and methods are contemplated in connection with the aircraft 112, primarily because the aircraft is larger. Larger aircraft 112 are heavier. As a result, the landing gear for larger aircraft may be more robust. This means that the landing gear for a larger aircraft, such as the aircraft 112, will be heavier than the landing gear 22 for the aircraft 46. Heavier landing gear 22 are contemplated to present additional engineering challenges.

In particular, it is contemplated that, when the landing gear for an aircraft 46, 112 exceed a predetermined weight W, it may not be suitable for the hydraulic pump 68 to provide sufficient pressure to direct the landing gear hydraulic actuator 14 UP over a brief period of time. It is possible that, if the hydraulic pump 68 attempts to lift the landing gear 22 rapidly, cavitation may occur in the hydraulic pump 68. Cavitation occurs when a fluid is subject to pressures such that the fluid flashes into vapor. When the vapor returns to a liquid state, the collapse of the vapor "bubbles" may have deleterious effects on the operation of the hydraulic pump 68. Accordingly, when the weight W of the landing gear exceeds a predetermined amount, it may be more prudent to employ the apparatus illustrated in FIG. 10 and the method discussed in connection with FIG. 11.

Figure 10:
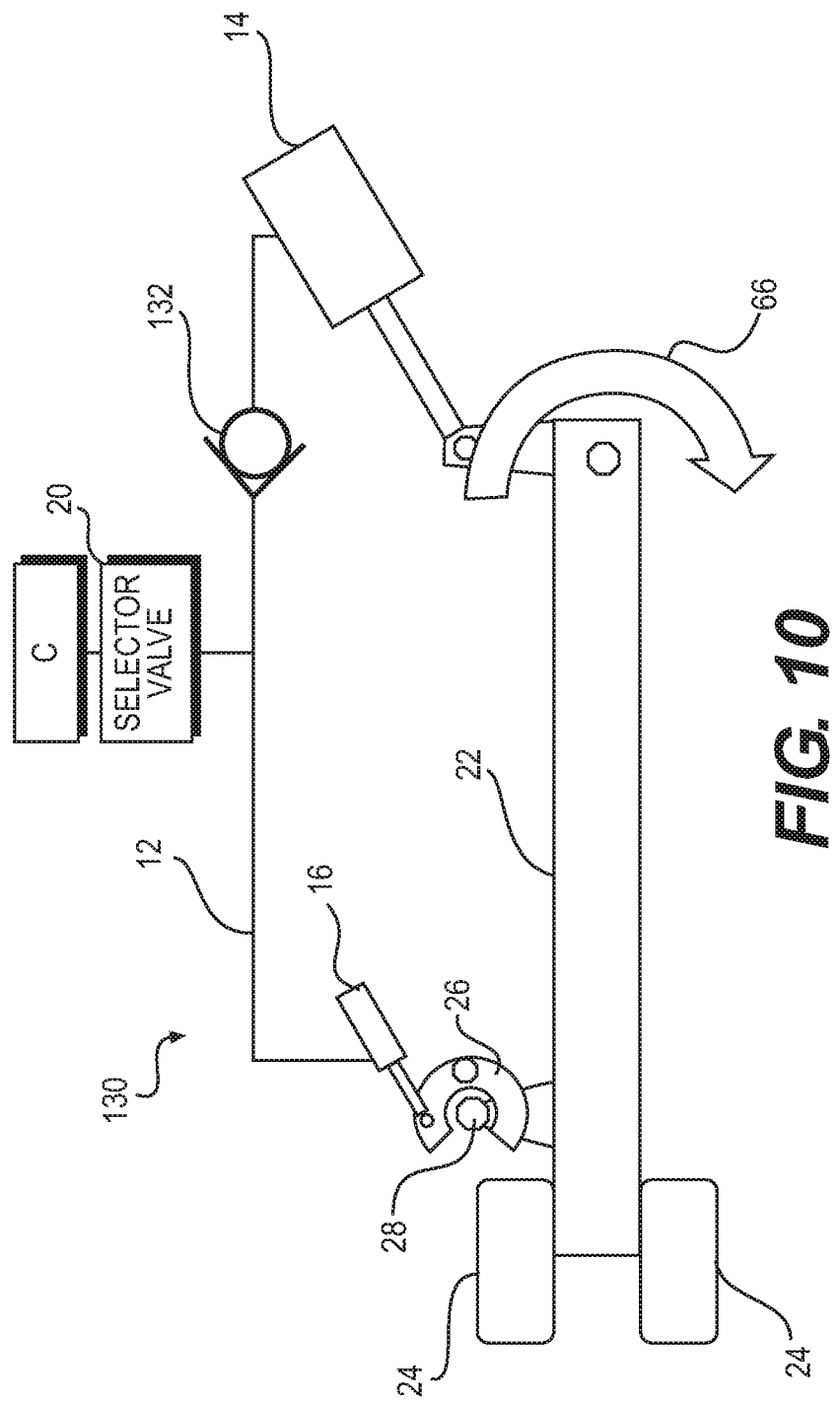
FIG. 10 is a graphical representation of a second embodiment of the apparatus according to the present invention.

FIG. 10 is a graphical representation of one hydraulic system 130 that may be employed on the aircraft 112. The hydraulic system 130 is similar to the hydraulic systems described above. The hydraulic system 130 differs in that the system 130 includes a piloted check valve 132 (also referred to as a pilot operated check valve 132) upstream of the landing gear hydraulic actuator 14. The piloted check valve 132 delays the actuation of the landing gear hydraulic actuator 14 by a time sufficient for the uplock to clear the pin 28. As a result, the addition of the piloted check valve 132 helps to avoid the force fight or loud thump described above.

As should be apparent to those skilled in the art, a check valve typically operates to permit fluid flow in one direction only. The check valve then closes when the pressure falls below the predetermined threshold. As should be apparent to those skilled in the art, a piloted check valve 132 operates similarly to a non-piloted check valve. A piloted check valve 132 may be actuated during the time when a pilot pressure is maintained in the piloted check valve 132. In other words, for a piloted check valve 132 to operate, the piloted check valve 132 must be subjected to a predetermined piloted pressure. During the time that the piloted check valve 132 is subjected to the predetermined piloted pressure, the piloted check valve 132 will permit the hydraulic fluid to flow in a direction opposite to that of a non-piloted check valve. As should be apparent, the predetermined piloted pressure may not be the same as the pressure that triggers the opening of the check valve.

With this overview, the operation of the system 130 will now be explained. Specifically, when the selector valve 20 is opened (i.e., in the UP position), the hydraulic piping 12 is pressurized. When the hydraulic piping 12 is pressurized (i.e., in the UP direction), the landing gear actuator 14 also is pressurized (i.e., in the UP position). The selector valve 20 then transitions from the UP position to a DOWN position. During this transition, the pressure in the landing gear actuator 14 is maintained in the UP position by the piloted check valve 132. As a result of the upward stroke of the landing gear actuator 14, the landing gear rotates in the direction of the arrow 66. The landing gear actuator 14 is held in the UP position by the piloted check valve 132 during the time that the selector valve 20 transitions between the UP position and the DOWN position. After the selector valve 20 transitions to the DOWN position, the hydraulic piping 12 is pressurized in the DOWN position. This causes the uplock actuator 16 and the pilot line of the piloted check valve 132 to become pressurized in the DOWN condition and also permits the landing gear actuator 14 to actuate into the DOWN position. The piloted check valve 132 releases the landing gear hydraulic actuator 14 from the UP condition after a brief delay, which permits the uplock 26 to move first, thereby avoiding interference with the pin 28 and, therefore, the landing gear 22.

Figure 11:
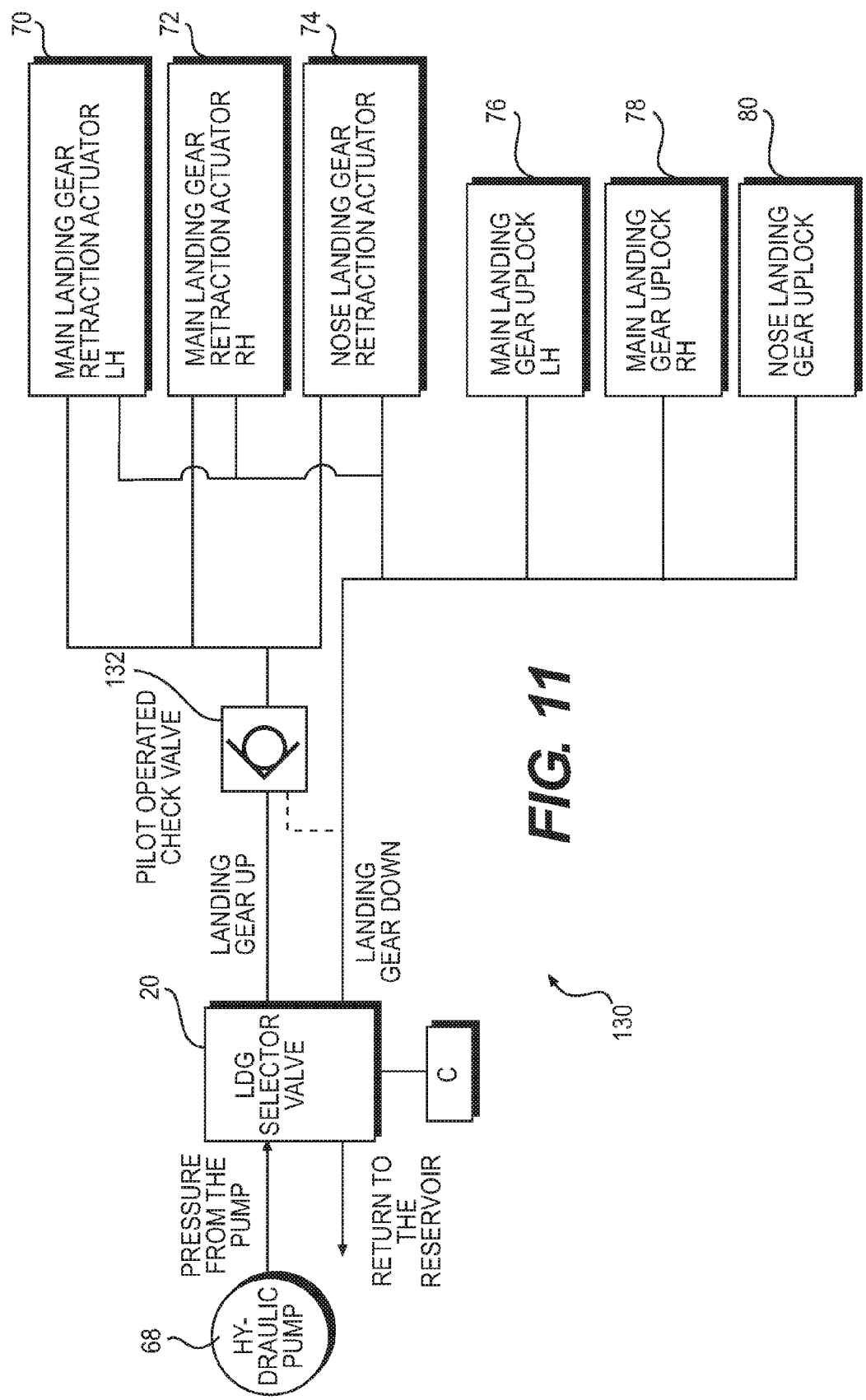
FIG. 11 is a diagrammatic representation of the apparatus illustrated in FIG. 10.

Like FIG. 6, FIG. 11 is a diagrammatic illustration of the system 130 illustrated in FIG. 10. In this view, the hydraulic pump 68 is shown. In addition, the landing gear elements are separated into three parts, as would be found on the aircraft 112. Specifically, the system 130 includes a left hand landing gear actuator 70, a right hand landing gear actuator 72, and a nose landing gear actuator 74. In addition, the system includes a left hand uplock actuator 76, a right hand uplock actuator 78, and a nose uplock actuator 80. Each of the actuators are contemplated to operate in the manner discussed above.

Figure 12:
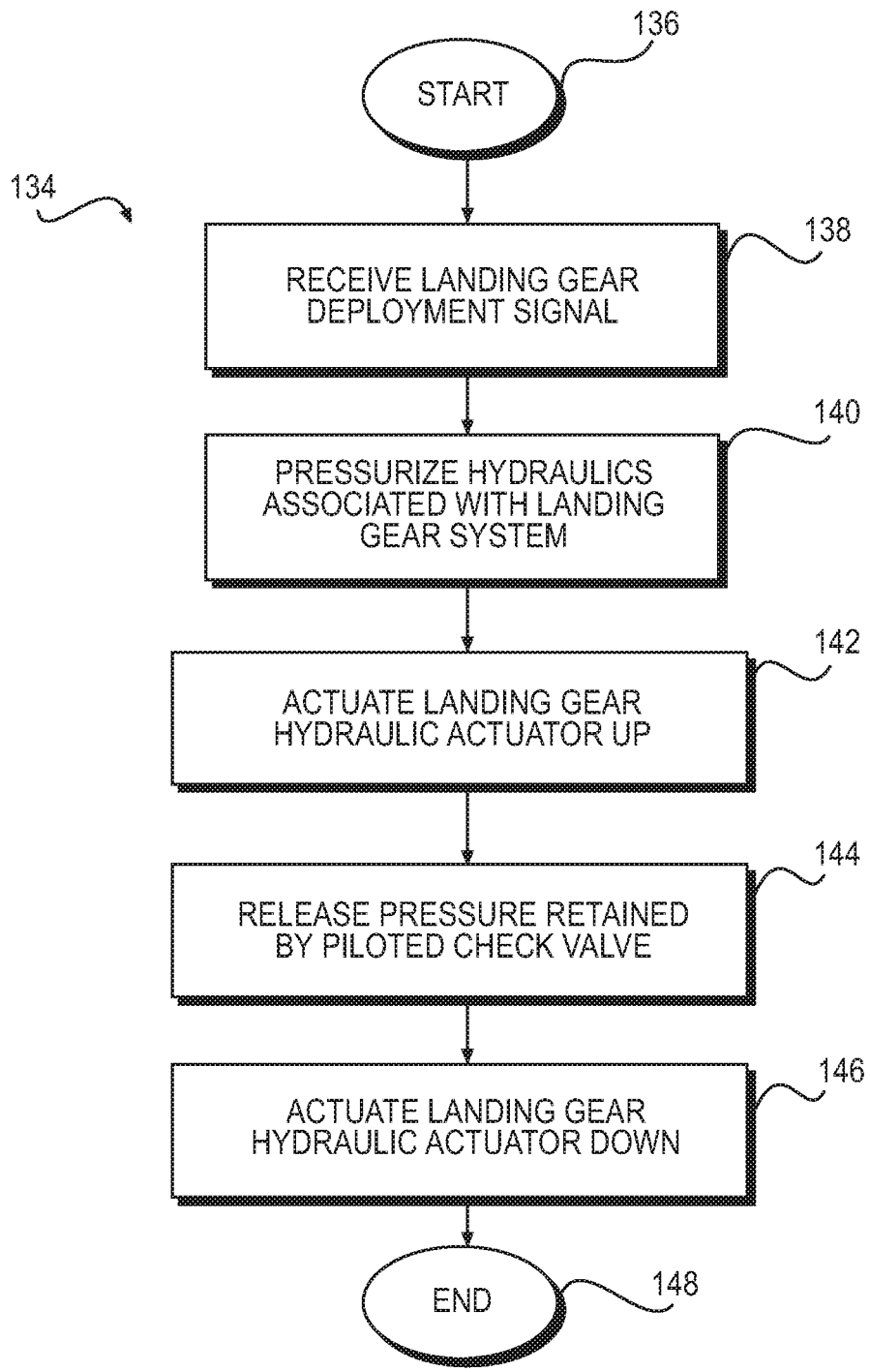
FIG. 12 is a flow chart illustrating a second method operable on the apparatus illustrated in FIG. 10.

FIG. 12 is a flow chart that illustrates one method 134 contemplated for operation of the system 130 illustrated in FIGS. 9 and 10.

The method 134 begins at step 136.

The method 134 proceeds to step 138 where the system 130 receives a landing gear deployment signal at the controller C.

The method 134 proceeds to step 140 where the system 130 is pressurized with hydraulic fluid. As noted above, this is accomplished by the selector valve 20.

From step 140, the method 134 proceeds to step 142, where the landing gear hydraulic actuator 16 is actuated UP.

At step 144, the pressure retained by the piloted check valve 132 is released. In this step, the piloted check valve 132 opens so that the hydraulic fluid may actuate the landing gear actuator 14 in the DOWN direction, which causes the landing gear 22 to deploy from the stowed condition.

At step 146, the landing gear hydraulic actuator 14 is actuated DOWN to lower the landing gear 22 into the deployed condition.

The method 134 ends at step 148.

Figure 13:
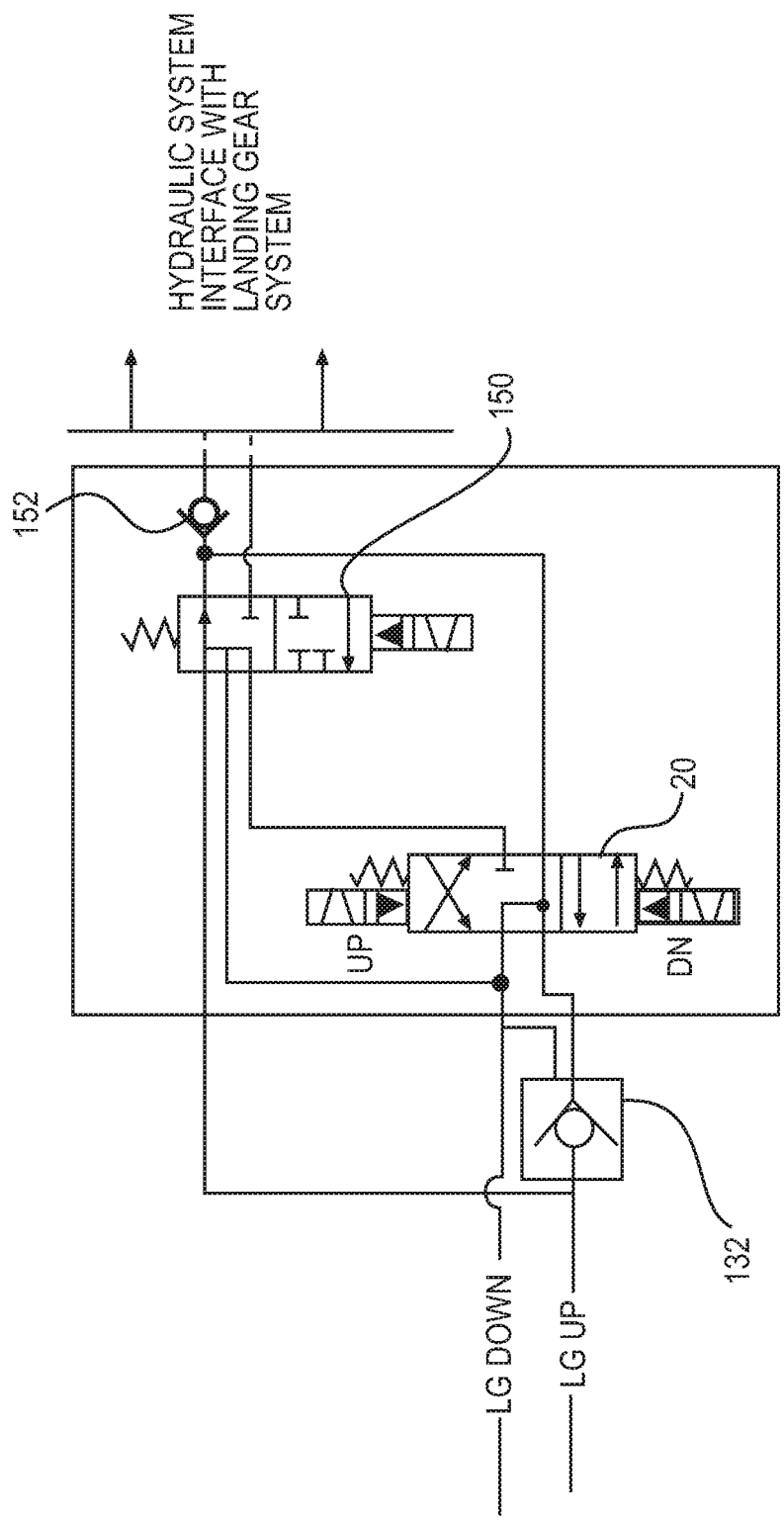
FIG. 13 is a portion of a hydraulic circuit illustrating the embodiment shown in FIG. 10.

FIG. 13 is a schematic diagram of a portion of the system 130 illustrated in FIGS. 10-11. In the illustrated embodiment, the selector valve 20 is shown. In addition, a free fall selector valve 150 is illustrated together with a check valve 152 and the piloted check valve 132. As should be apparent to those skilled in the art, the selector valve 150 directs hydraulic fluid into the system 130 to make operation of the various hydraulic components possible. The selector valve 150 may be actuated via any of a number of different methodologies including, but not limited to, electrical activation (e.g., by the controller C), manual activation, electromechanical activation, etc. The free fall selector valve 150 is actuated (typically manually) by a member of the flight crew when the aircraft is in an emergency mode of operation and it becomes necessary to deploy the landing gear manually. The free fall selector valve 150 may release the pressure in the hydraulic system 130 to permit manual deployment of the landing gear 22. The check valve 152, which is a non-piloted check valve, is understood to facilitate operation of the system 130 when, for example, the free fall selector valve 150 is actuated.

Figure 14:
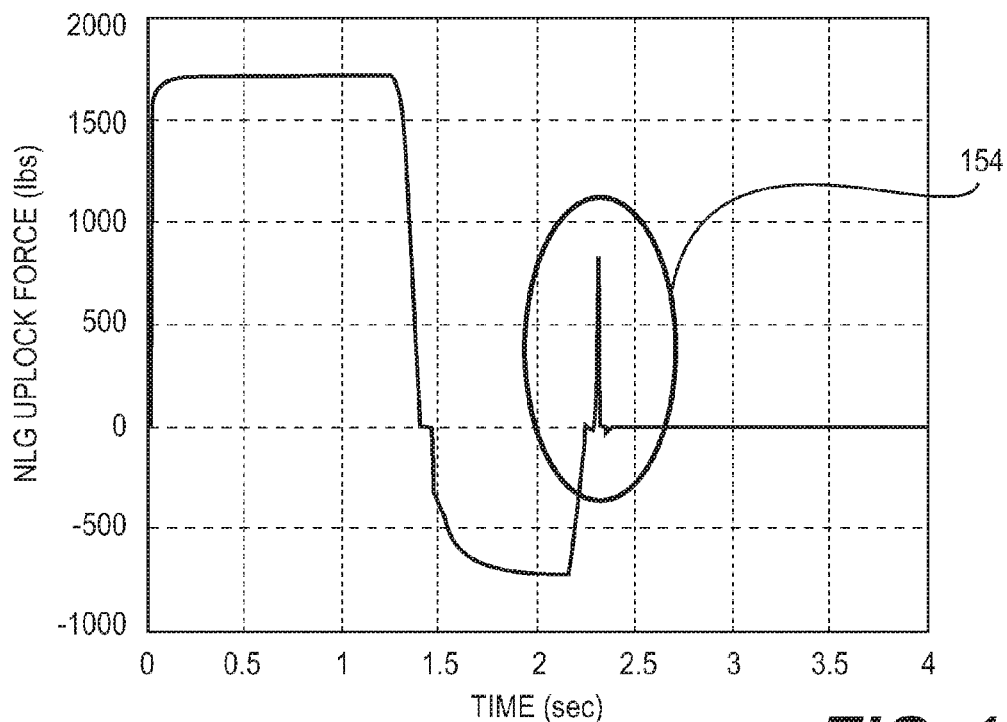
FIG. 14 is a graph illustrating the force fight identified with respect to the operation of the prior art.

FIG. 14 is a graphical representation of a prior art hydraulic system that includes the force fight 154 discussed above. The spike in forces, resulting from the combined weight W and load L from the landing gear hydraulic actuator 14, is visible in this view.

Figure 15:
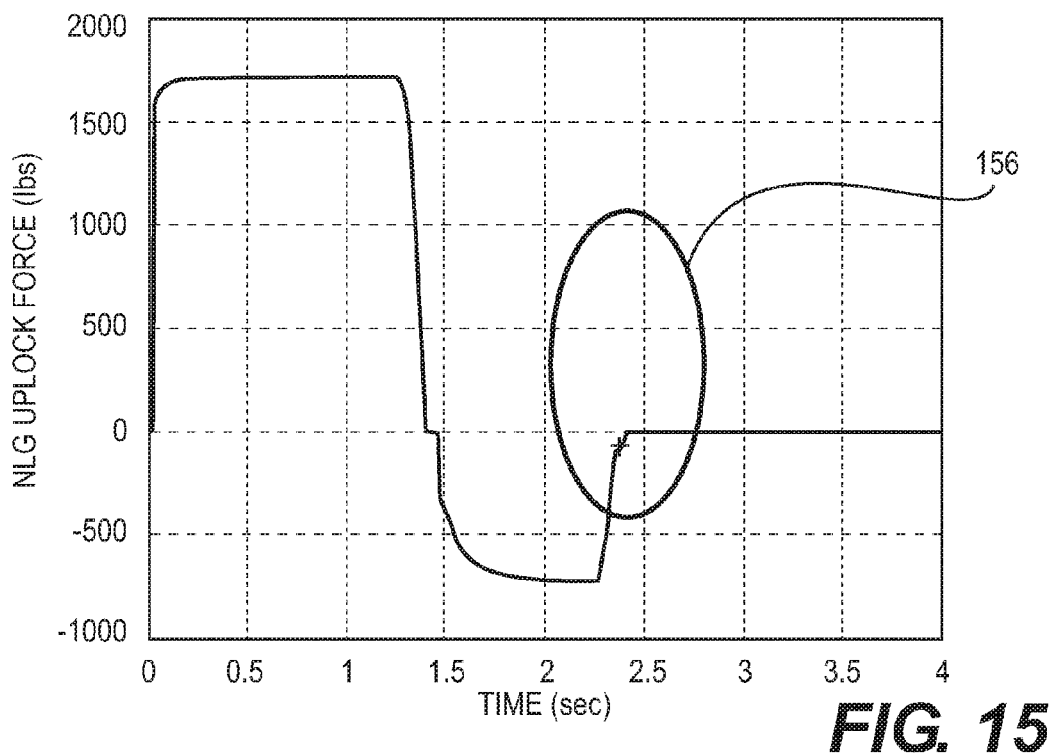
FIG. 15 is a graph illustrating the absence of the force fight after application of at least the second method of the present invention, as shown in FIG. 12.

FIG. 15 is a graphical representation of the operation of the system 130 of the present invention, which is considered representative of the various embodiments of the present invention. The force fight is absent 156 from this view.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A landing gear system, comprising:
   a landing gear movable between a stowed position and a deployed position;
   a landing gear hydraulic actuator operably connected to the landing gear;
   an uplock releasably engageable with the landing gear;
   an uplock hydraulic actuator operably connected to the uplock;
   a selector valve for causing selective pressurization of the landing gear hydraulic actuator and the uplock hydraulic actuator, the selector valve being connected to the landing gear hydraulic actuator by at least a first hydraulic line and being connected to the uplock hydraulic actuator by at least a second hydraulic line;
   a piloted check valve positioned in the first hydraulic line between the selector valve and the landing gear hydraulic actuator;
   a pilot line hydraulically connecting the second hydraulic line to the piloted check valve; and
   a controller, wherein in response to receipt of a command to deploy the landing gear:
      causing the selector valve to acquire an UP condition for actuating the landing gear hydraulic actuator to an UP condition, wherein the landing gear hydraulic actuator is held in the UP condition via the piloted check valve;
      causing the selector valve to acquire a DOWN condition for actuating the landing gear hydraulic actuator to a DOWN condition; and
      causing the piloted check valve to be released, thereby permitting the landing gear hydraulic actuator to acquire the DOWN condition.

2. The landing gear system of claim 1, further comprising an uplock hydraulic actuator operably connected to the uplock, the selector valve operative for causing selective pressurization of the uplock hydraulic actuator.

3. The landing gear system of claim 2, wherein when the selector valve is caused to acquire the DOWN condition, the uplock hydraulic actuator causes the uplock to disengage from the landing gear.

4. The landing gear system of claim 3, wherein the piloted check valve delays the actuation of the landing gear hydraulic actuator to the DOWN condition by a time sufficient to allow the uplock hydraulic actuator to cause the uplock to disengage from the landing gear.

5. The landing gear system of claim 3, wherein when the selector valve is caused to acquire the UP condition, the uplock hydraulic actuator is also actuated to an UP condition.

6. The landing gear system of claim 2, wherein the first and second hydraulic lines connect the uplock hydraulic actuator and the landing gear hydraulic actuator to one another.

7. The landing gear system of claim 6, wherein the first hydraulic line connected to the landing gear hydraulic actuator is larger than the second hydraulic line connected to the uplock hydraulic actuator.

8. The landing gear system of claim 1, wherein the landing gear is one of a right side landing gear, a left side landing gear and a nose landing gear.

9. The landing gear system of claim 1, wherein the piloted check valve is caused to be released via application of a pilot pressure.

10. The landing gear system of claim 1, wherein when the controller actuates the selector valve to the UP condition for actuating the landing gear hydraulic actuator to an UP condition, a weight of the landing gear on the uplock is reduced.

11. The landing gear system of claim 1, wherein when the controller actuates the selector valve to the UP condition for actuating the landing gear hydraulic actuator to an UP condition, a weight of the landing gear on the uplock is removed.

12. A method of operating a landing gear system that comprises landing gear, a landing gear hydraulic actuator operably connected to the landing gear, an uplock releasably engageable with the landing gear, an uplock hydraulic actuator operably connected to the uplock, a selector valve for causing selective pressurization of the landing gear hydraulic actuator and the uplock hydraulic actuator, the selector valve being connected to the landing gear hydraulic actuator by at least a first hydraulic line and being connected to the uplock hydraulic actuator by at least a second hydraulic line, a piloted check valve positioned in the first hydraulic line prior to the landing gear hydraulic actuator, a pilot line hydraulically connecting the second hydraulic line to the piloted check valve, and a controller operably connected to the landing gear hydraulic actuator, the uplock hydraulic actuator and the piloted check valve, the method comprising:
   receiving a landing gear deployment signal by the controller;
   actuating the landing gear hydraulic actuator to an UP condition to remove at least some of the weight of the landing gear from the uplock;
   causing the landing gear hydraulic actuator to be held in the UP condition via the piloted check valve;
   actuating the uplock hydraulic actuator to a DOWN condition to disengage the uplock from the landing gear; and
   releasing the piloted check valve, thereby permitting the landing gear hydraulic actuator to be actuated to the DOWN condition.

13. The method of claim 12, further comprising:
causing the selector valve to acquire an UP condition for actuating the landing gear hydraulic actuator to an UP condition, wherein the landing gear hydraulic actuator is held in the UP condition via the piloted check valve.

14. The method of claim 13, further comprising:
in response to receipt of the landing gear deployment signal by the controller, causing the selector valve to acquire the UP condition for actuating both the uplock hydraulic actuator and the landing gear hydraulic actuator to the UP condition.

15. The method of claim 13, further comprising:
causing the selector valve to acquire a DOWN condition for actuating the uplock hydraulic actuator to the DOWN condition.

16. The method of claim 15, further comprising:
causing the selector valve to acquire a DOWN condition for actuating both the uplock hydraulic actuator to the DOWN condition and the landing gear hydraulic actuator to the DOWN condition.

17. The method of claim 16, wherein the piloted check valve delays the actuation of the landing gear hydraulic actuator to the DOWN condition by a time sufficient to allow the uplock hydraulic actuator to cause the uplock to disengage from the landing gear.

18. The method of claim 12, wherein the first and second hydraulic lines connect the uplock hydraulic actuator and the landing gear hydraulic actuator to one another.

19. The method of claim 18, wherein the first hydraulic line connected to the landing gear hydraulic actuator is larger than the hydraulic piping connected to the uplock hydraulic actuator.

20. The method of claim 12, further comprising applying a pilot pressure to the piloted check valve to cause release of the piloted check valve.

* * * * *